March 10, 1964  E. K. BUYZE  3,124,216
WEDGE OPERATED, SELF ENERGIZING, FLUID COOLED DISK BRAKE
Filed Nov. 17, 1960  4 Sheets-Sheet 1

INVENTOR.
Edwin K. Buyze.
BY
Wm. R. Glisson
ATTORNEY

March 10, 1964     E. K. BUYZE     3,124,216
WEDGE OPERATED, SELF ENERGIZING, FLUID COOLED DISK BRAKE
Filed Nov. 17, 1960     4 Sheets-Sheet 2

*INVENTOR.*
Edwin K. Buyze
BY
Wm. R. Glisson
*ATTORNEY*

March 10, 1964 E. K. BUYZE 3,124,216
WEDGE OPERATED, SELF ENERGIZING, FLUID COOLED DISK BRAKE
Filed Nov. 17, 1960 4 Sheets-Sheet 3

INVENTOR.
Edwin K. Buyze
BY
Wm. R. Glisson
ATTORNEY

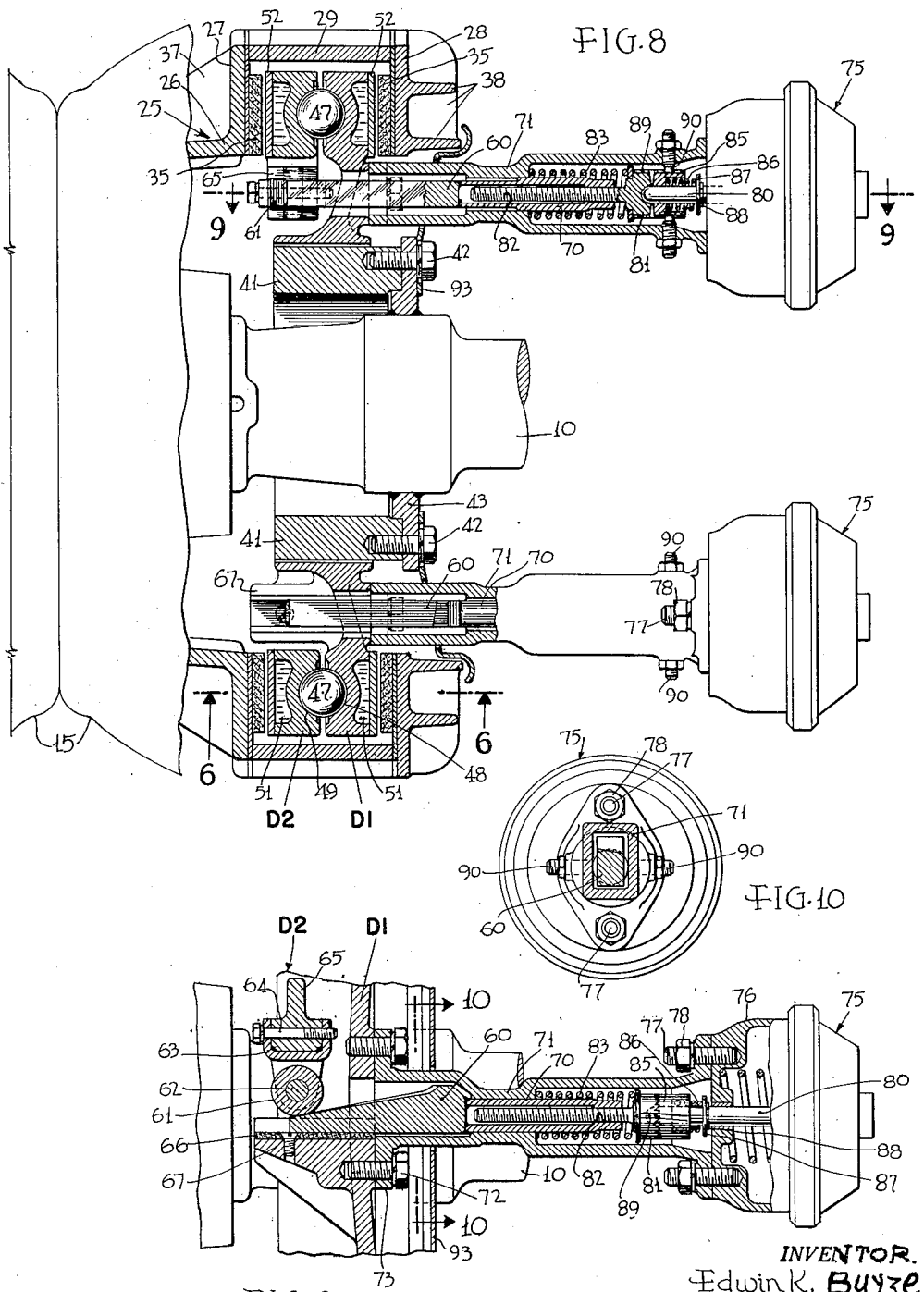

United States Patent Office 3,124,216
Patented Mar. 10, 1964

3,124,216
WEDGE OPERATED, SELF ENERGIZING, FLUID COOLED DISK BRAKE
Edwin K. Buyze, St. Clair Shores, Mich., assignor to The Budd Company, Philadelphia, Pa., a corporation of Pennsylvania
Filed Nov. 17, 1960, Ser. No. 70,040
7 Claims. (Cl. 188—72)

This invention relates to disk brakes, particularly for automotive vehicles, and has for an object the provision of improvements in this art.

One of the particular objects is to provide fluid cooled disk brakes.

Another object is to provide improved brake operating means.

Another object is to provide improved heat isolating means for the heat dissipating means.

Another object is to provide improved means for automatically adjusting the brakes.

Another object is to provide improved means for rigidifying the braking spread-resisting assembly.

Another object is to provide improved means for mounting brake shoe linings.

The above and other objects and advantages of the invention will be apparent from the following description of an exemplary embodiment, reference being made to the accompanying drawings, wherein:

FIG. 8 is an axial section taken on the line 8—8 of FIG. 5;

FIG. 9 is an axial section taken on the line 9—9 of FIG. 8;

FIG. 10 is a transverse section taken on the line 10—10 of FIG. 9; and

Figure 1:
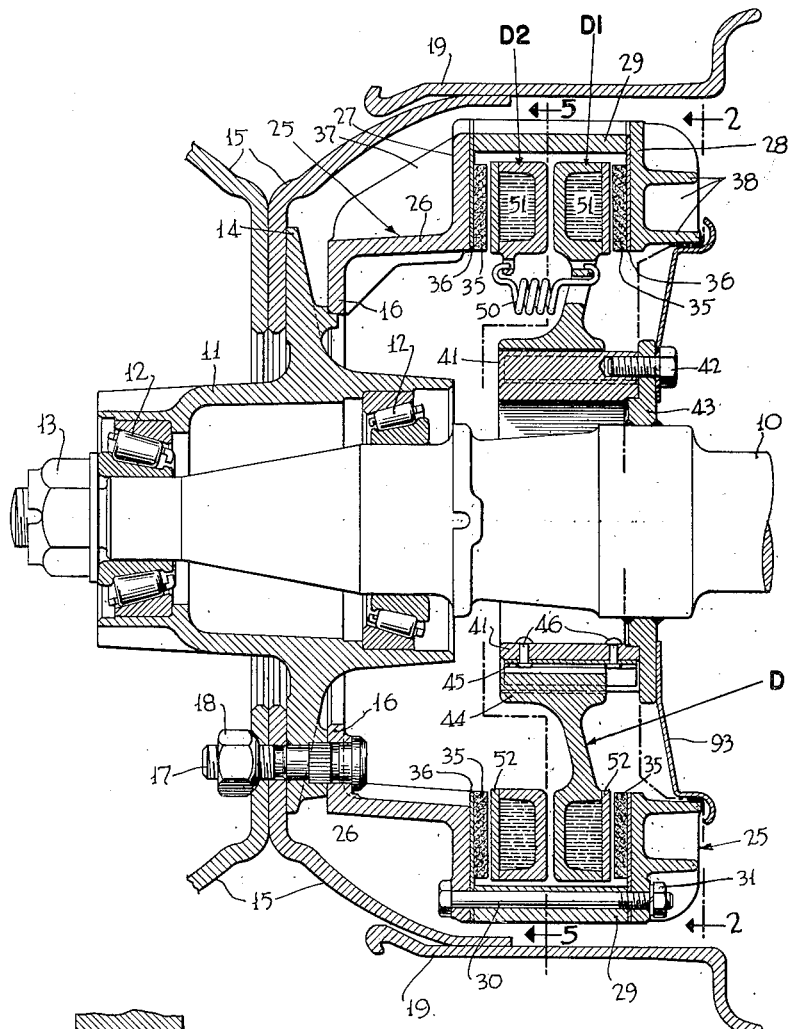
FIG. 1 is an axial section through a brake embodying the invention, the view being taken on the line 1—1 of FIG. 2.

As shown in the drawings, an axle or spindle 10 has mounted thereon a wheel hub 11, in this case the wheel being a non-driven one with roller bearings 12 between the hub and axle. The assembly is retained by a nut 13.

The hub 11 is provided with a flange 14 to which are secured one or more wheel disks 15 and a brake drum flange 16, as by bolts 17 and nuts 18. A rim 19 is secured on the peripheral axial flange 20 of one of the wheel disks.

A brake drum 25, has an outer annular axially extending portion 26 which carries the flange 16 and an outer annular radially extending portion 27 which may be referred to as the brake shoe backing member.

The brake drum also includes an inner annular radially extending portion 28 and an intermediate annular spacer portion 29 which here is made as a separate piece. The radial portions 27 and 28 are connected through the annular spacer portion 29, as by bolts 30 with nuts 31.

Brake shoe lining pads 35 are secured in known manner, by rivets, adhesive or the like, to supporting plates 36 which extend out between the radial portions and the spacer so as to be secured by the bolts 30. As shown, there are two pads on each supporting plate and five sector or supporting plates, giving ten pads for each radial backing member.

The outer brake drum member is provided with strengthening and cooling rib elements 37 and the inner drum member is similarly provided with rib elements 38.

A brake reaction disk assembly D is mounted slidably and non-rotatably on a splined drum or spider 41 which is secured, as by cap bolts 42, to an anchor flange 43 which is secured, as by fillet arc welding, to an enlarged part of the axle 10. The hub 44 of a disk member D1 of the disk assembly is provided with coacting spline formations; and low-friction wear resisting and heat insulating lining material 45 is carried by one of the splined members, here the inner one, the lining elements being secured, as by rivets 46.

A second disk member D2 is provided alongside the disk member D1, being loosely supported thereon by a plurality (8 shown) of balls 47 disposed in facing ramp races 48 and 49 of the members D1 and D2 respectively. A plurality (4 shown) of tension return springs 50 strongly urge the members D1 and D2 axially toward each other.

The members D1 and D2 have relative circumferential movement as well as relative axial movement with respect to each other and the circumferential movement causes the balls to ride up on their ramps to move the members apart axially against the springs.

The brake disk members D1 and D2 have annular fluid chambers 51 at their outer peripheries, the chambers being closed by friction face plates 52 which are sealingly secured over the open sides of the chambers, as by high temperature brazing. The disk member D1 is provided with fluid port connections 53 and 54 for circulating fluid and the disk member D2 is provided with similar port connections 55 and 56. Flexible fluid lines 57 are provided for circulating the coolant fluid.

It is not believed to be necessary to show the fluid pipe lines, cooling radiator and fluid circulating means herein, these means not being a specific part of the present invention and the invention being understandable without illustrating them.

Means are provided for moving the brake disk members D1 and D2 circumferentially relative to each other to cause them to ride up along their ramps 48 and 49 on the balls 47 to move the disk members apart axially against the springs 50 to apply the brakes. The means herein provided comprises an actuating wedge 60 carried by one disk member (the inner one D1 here) and acting against a follower element carried by the other disk member. Here the follower is formed as a roller 61 carried by a shaft 62 mounted on a yoke 63 pivoted, as by a pin 64, on a projection 65 provided on the disk member D2. The back of the wedge is supported on low-friction wear resisting lining material 66 secured on a projection 67 provided on the inner disk member D1.

The wedge 60 is provided with a tubular guide and actuating stem 70 slidably mounted in a guide support 71 carried by the disk member D1, as by being secured thereto by cap bolts 72 passing through holes in a base flange 73 thereof.

A power actuating device 75 is provided for operating the wedge, the actuating device shown being of the fluid operated diaphragm (or piston) type having a housing 76 secured to the flanged end of the guide support 71, as by stud bolts 77 and nuts 78.

The power device 75 includes a plunger 80 having a spherical end which engages a spherical socket in the ratchet head 81 of an adjusting screw 82 threaded into a bore in the tubular guide stem 70 of the wedge 60. A spring 83 urges the stem and adjusting screw in a direction against the direction of push of the actuating plunger 80.

Means are provided for automatically adjusting the screw 82 to move the wedge forward as the brake lining wears. For this purpose a ratchet sleeve 85 is mounted for turning and axial movement on the plunger 80. It is pressed axially by a spring 86 having one end seated in a recess thereof and having its other end in engagement with a washer 87 held by a snap ring 88 on the plunger.

The sleeve 86 is provided on its side with inclined grooves 89 which receive the ends of stud elements 90 carried by the sides of the guide support 71. Each time the brake is actuated the sleeve 86 is pushed down by the plunger and is turned as it moves down by the action of the stud elements 90 in the grooves 89. This causes the ratchet teeth on the end of the sleeve to ride up on the ratchet teeth of the head 81, the spring 86 allowing the sleeve to move back, and if the braking movement is sufficiently long the sleeve moves a complete tooth pitch to engage in a new position. Then when the plunger and cam sleeve retract the adjusting screw is turned to move the wedge outward on the adjusting screw.

A dust guard plate 93 is secured to the anchor flange 43 and covers the inner side of the brake assembly.

In operation, the brake disks D1 and D2 are constantly kept cool by circulating fluid. The supply and circulating means are not shown but it will be understood that the actual circulation can readily be controlled by demand, for example the temperature of the coolant or the length of time the brakes are applied.

To apply the brakes, the power device 75 is energized to move the wedge 60 axially across the disks D1, D2. This causes the disks to move circumferentially relative to each other, which forces the ramps 48, 49 to ride up on the balls 47 and force the disks apart axially against the linings of the brake drum.

When the brake lining becomes worn sufficiently the brake adjusting mechanism 81, 82, 85, 89, 90 etc. comes into action to move the ratchet teeth 81, 85 up one tooth to turn the screw 82 and force the wedge forward. The screw has sufficient resistance to turning to allow the inclined faces of the ratchet teeth to ride up on each other without turning the screw reversely. Then when a tooth has been jumped the adjustment takes place as the brakes are released.

Figure 11:
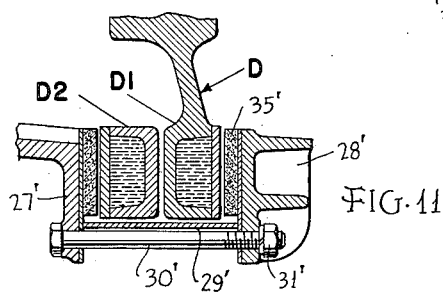
FIG. 11 is a partial axial section like the lower part of FIG. 1 but showing a modification.
Figure 2:
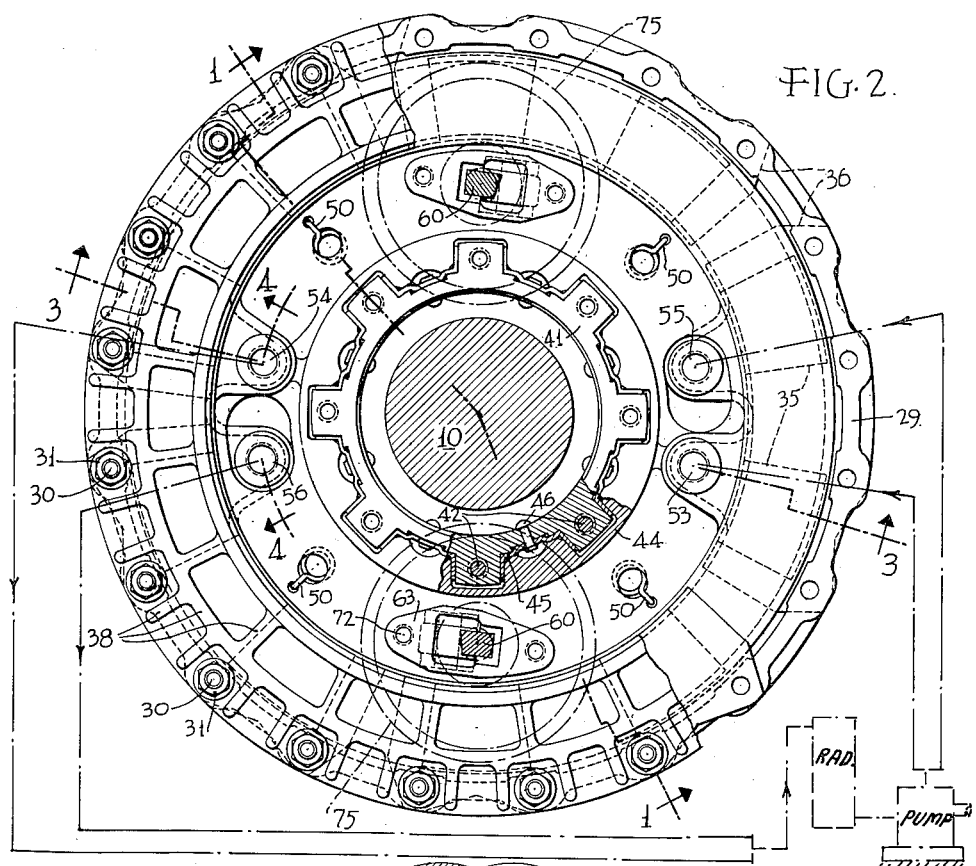
FIG. 2 is a side elevation, partly in section, taken on the line 2—2 of FIG. 1.
Figure 3:
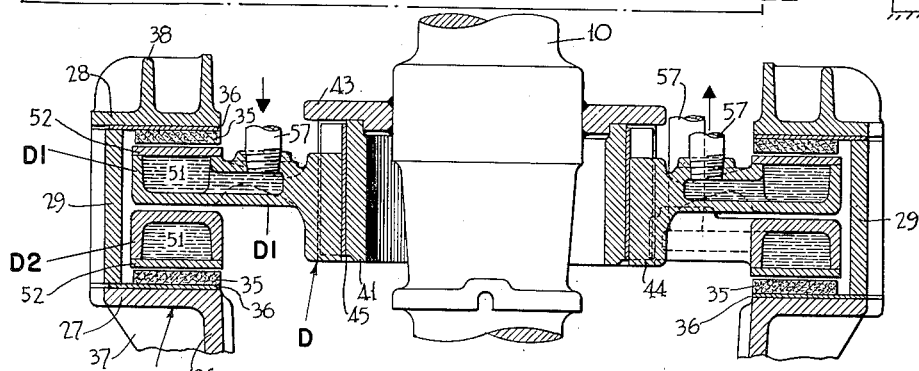
FIG. 3 is an axial section taken on the line 3—3 of FIG. 2.
Figure 4:
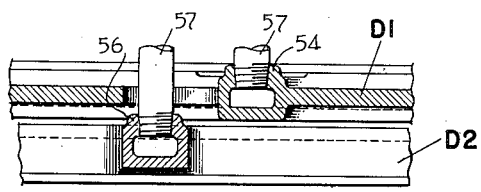
FIG. 4 is a partial axial section taken on the line 4—4 of FIG. 2.
Figure 5:
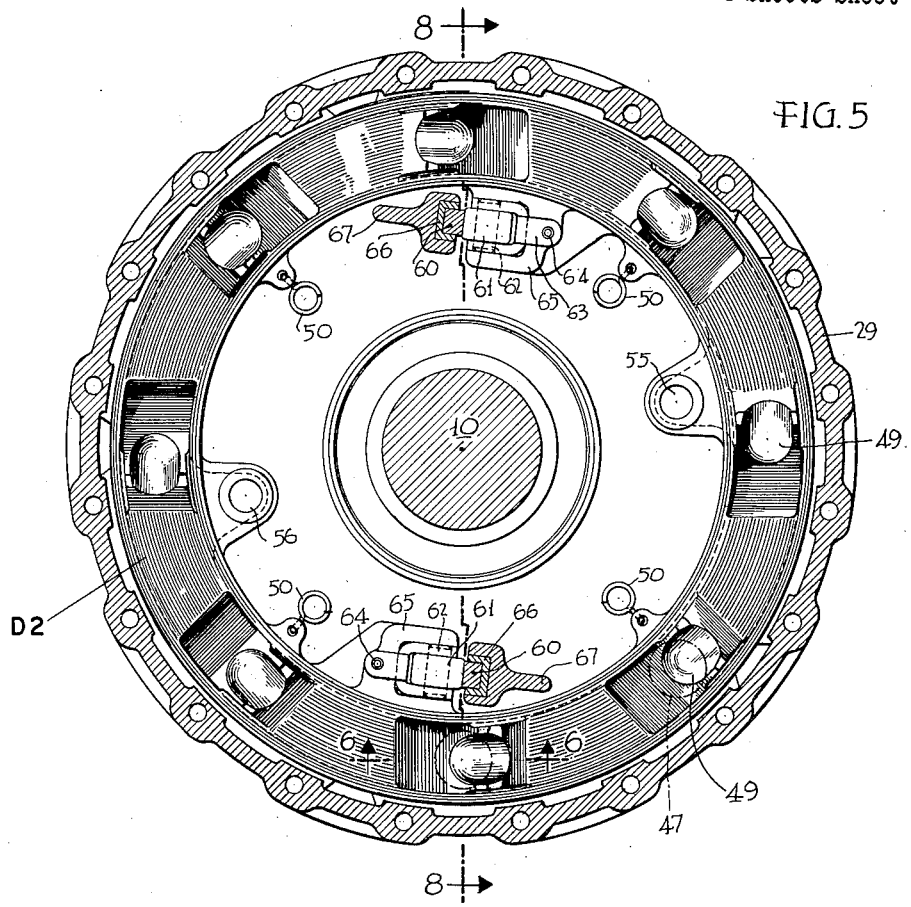
FIG. 5 is a transverse section taken on the line 5—5 of FIG. 1.
Figure 6:
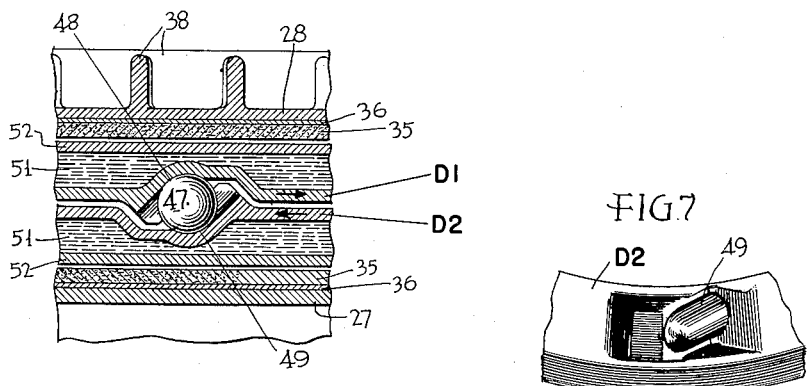
FIG. 6 is a partial enlarged axial section taken on the line 6—6 of FIG. 5.
Figure 7:
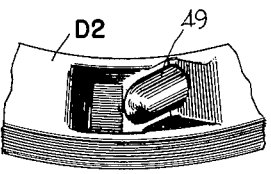
FIG. 7 is a perspective view of a ball ramp.

In the form shown in FIG. 11 the spacer 29' is located radially within the circle on which the bolts 30' are located and the bolts are tightened to put them in pretension. This reduces the axial spread or lining load deflection when the brakes are applied, in the example illustration given the reduction in deflection being about 12%. This could be increased by spacing the bolt circle radially further outward from the spacer or by increasing the size and stiffness of the spacer or bolts or both.

It is thus seen that the invention provides improved brake operating, cooling and adjustment means which is simple, reliable and economical.

While certain embodiments of the invention have been described for purposes of illustration, it is to be understood that there may be various embodiments and modifications within the general scope of the invention.

What is claimed is:

1. A disk brake assembly comprising in combination, a rotary drum provided with axially spaced radial brake surfaces arranged in outer annular zones facing each other at a fixed axial distance apart, said drum being open and free from rotating parts at one end within said annular zones, brake lining carried by said radial annular brake surfaces, a fixed support, a brake disk unit carried by said fixed support within said drum and having axial movement on said fixed support, said brake disk unit including two disk members mounted for limited axial and circumferential movement relative to each other and having radial outer annular metallic friction surfaces disposed between and facing the annular lined brake surfaces of said drum, one of said disk members being mounted on guides for axial movement on said fixed support and the other disk member being carried by and resiliently urged toward said one disk member with provision for limited axial and circumferential movement relative to said one disk member, self-energizing means, including parallel mating ramps on said disk members with roller means between ramps, for producing relative axial movement between said disk members when said disk members are first given circumferential movement, brake actuation means for producing said relative circumferential movement between said disk members and subsequently initiating said self-energizing means, said disk members having chambers therein for cooling fluid, and means extending out axially within the open end of said drum for circulating cooling fluid through the chambers of said disk members.

2. A disk brake assembly comprising in combination, a rotary drum provided with axially spaced radial brake surfaces arranged in outer annular zones facing each other at a fixed axial distance apart, said drum being open and free from rotating parts at one end within said annular zones, brake lining carried by said radial annular brake surfaces, a fixed support, a brake disk unit carried by said fixed support within said drum and having axial movement on said fixed support, said brake disk unit including two disk members mounted for limited axial and circumferential movement relative to each other and having radial outer annular metallic friction surfaces disposed between and facing the annular lined brake surfaces of said drum, one of said disk members being mounted on guides for axial movement on said fixed support and the other disk member being carried by and resiliently urged toward said one disk member with provision for limited axial and circumferential movement relative to said one disk member, means, including mating ramps on said disk members with roller means between ramps, for producing relative axial movement between said disk members when they are given relative circumferential movement, means for producing relative circumferential movement between said disk members, said disk members having chambers therein for cooling fluid, and means extending out axially within the open end of said drum for circulating cooling fluid through the chambers of said disk members, said cooling fluid chambers of said disk members being disposed behind said annular radial surfaces, and said ramps for moving said disks apart axially when they are given relative circumferential movement being formed on projections entering the back portion of the fluid chambers to force fluid to flow toward the front friction surfaces.

3. A water cooled disk brake assembly comprising in combination, a rotary drum provided with axially spaced radial brake surfaces in outer annular zones facing each other at a fixed axial distance apart, said drum being open and free from rotating parts at one end within said annular zones, brake lining for said radial annular brake surfaces, said drum being formed by end parts with outer circumferential spacer means between them and means for securing the end parts together upon said spacer means, and said brake lining being carried by segmental plates to form lined segments secured axially by and between said end parts and said spacer means so that the lined segments can be moved in or out radially when the end parts and spacer means are moved apart, a fixed support, a brake disk unit carried by said fixed support within said drum and having axial movement on said fixed support, said brake disk unit including two disk members, a first said disk member being axially movable and circumferentially fixed on said fixed support, the other said disk member being mounted on said first disk member for limited axial and circumferential movement relative to said first disk member, said disk members each having mounted on said first disk for limited and axial and circumferential movement relative to said first disk, said disks each having radial outer annular metallic friction surfaces disposed between and facing the annular lined brake surfaces, and actuating means mounted on said first disk member for producing limited relative axial and circumferential movement between said disk members to apply the brakes.

4. A disk brake assembly comprising in combination, a rotary drum provided with axially spaced radial brake surfaces in outer annular zones facing each other at a fixed axial distance apart, said drum being open and free from rotating parts at one end within said annular zones, brake lining mounted on the inner face of said radial annular brake surfaces, said drum being formed by end parts with outer circumferential spacer means between them and bolt means for securing the end parts together upon said spacer means, a fixed support, a brake disk unit carried by said fixed support within said drum and having axial movement in said fixed support, said brake disk unit including two disk members mounted for limited axial and circumferential movement relative to each other and having radial outer annular metallic friction surfaces disposed between and facing the annular lined brake surfaces, and means for producing limited relative axial and circumferential movement between said disk members to apply the brakes, said drum end parts extending outward radially beyond said spacer means and the means for securing the end parts together upon the spacer means including tension elements located at a distance radially beyond said spacer means to put pre-tension on the drum assembly to minimize axial spread of the radial brake surfaces of the drum during braking.

5. A disk brake assembly comprising in combination, a rotary drum provided with axially spaced radial brake surfaces arranged in outer annular zones facing each other at a fixed axial distance apart, said drum being open and free from rotating parts at one end within said annular zones, a fixed support, a brake disk unit carried by said fixed support within said drum and having axial movement on said fixed support, said brake disk unit including two disk members mounted for limited axial and circumferential movement relative to each other and having radial outer annular brake surfaces disposed between and facing the annular brake surfaces of said drum, one of said disk members being mounted on guides for axial movement on said fixed support and the other disk member being carried by and resiliently urged toward said one disk member with provision for limited axial and circumferential movement relative to said one disk member, self-energizing means, including mating parallel ramps on said disk members with roller means between ramps, for producing relative axial movement between said disk members when said disk members are first given relative circumferential movement, and brake actuating means for producing said relative circumferential movement between said disk members and subsequently initiating said self-energizing means, said actuating means including an axially movable wedge member and power means for operating said wedge member, both mounted on one of said disk members and having parts extending out of said open end, and a wedge reaction element carried by the other of said disk members.

6. A disk brake assembly comprising in combination, a rotary drum provided with axially spaced radial brake surfaces arranged in outer annular zones facing each other at a fixed axial distance apart, said drum being open and free from rotating parts at one end within said annular zones, a fixed support, a brake disk unit carried by said fixed support within said drum and having axial movement on said fixed support, said brake disk unit including two disk members mounted for limited axial and circumferential movement relative to each other and having radial outer annular brake surfaces disposed between and facing the annular brake surfaces of said drum, a first one of said disk members being mounted on guides for axial movement on said fixed support and the other disk member being carried by and resiliently urged toward said first disk member with provision for limited axial and circumferential movement relative to said other disk member, self-energizing means, including parallel mating ramps on said disk members with roller means between ramps, for producing relative axial movement between said disk members when said disk members are first given relative circumferential movement, and brake actuating means for producing said relative circumferential movement between said disk members and subsequently initiating said self-energizing means, said actuating means including an axially movable wedge member mounted on power means for operating said wedge member, said power means being mounted on said first disk member and having parts extending out of said open end of said drum, and a wedge reaction element carried by the other of said disk members, said disk member which carries the wedge member being provided with low-friction wear-resisting lining material disposed behind the wedge member, and said wedge reaction element mounted on the other disk member including a wedge-engaging pivoted roller.

7. A disk brake assembly comprising in combination, a rotary drum provided with axially spaced radial brake surfaces arranged in outer annular zones facing each other at a fixed axial distance apart, said drum being open and free from rotating parts at one end within said annular zones, a fixed support, a brake disk unit carried by said fixed support within said drum and having axial movement on said fixed support, said brake disk unit including two disk members mounted for limited axial and circumferential movement relative to each other and having radial outer annular brake surfaces disposed between and facing the annular brake surfaces of said drum, one of said disk members being mounted on guides for axial movement on said fixed support and the other disk member being carried by and resiliently urged toward said one disk member with provision for limited axial and circumferential movement relative to said one disk member, self-energizing means, including mating parallel ramps on said disk members with roller means between ramps, for producing relative axial movement between said disk members when said disk members are first given relative circumferential movement, and brake actuating means for producing said relative circumferential movement between said disk members and subsequently initiating said self-energizing means, said actuating means including an axially movable wedge member and power means for operating said wedge member, both mounted on one of said disk members and having parts extending out of said open end, and a wedge reaction element carried by the other of said disk members, said one disk member being mounted on splines on said fixed support, and heat-insulating low friction lining material carried between the interfitting parts of said splines.

References Cited in the file of this patent

UNITED STATES PATENTS

| | | |
|---|---|---|
| 728,443 | Clark | May 19, 1903 |
| 1,696,879 | Chase | Dec. 25, 1928 |
| 2,096,463 | Moody | Oct. 19, 1937 |
| 2,256,725 | Pierce et al. | Sept. 23, 1941 |
| 2,406,304 | Levy | Aug. 20, 1946 |
| 2,561,445 | McCune | July 24, 1951 |
| 2,821,271 | Sanford | Jan. 28, 1958 |
| 2,951,561 | Davis | Sept. 6, 1960 |
| 3,003,590 | Ash | Oct. 10, 1961 |
| 3,047,097 | Rockwell | July 31, 1962 |

FOREIGN PATENTS

| | | |
|---|---|---|
| 599,541 | Great Britain | Mar. 15, 1948 |
| 671,147 | Great Britain | Apr. 30, 1952 |
| 982,138 | France | Jan. 24, 1951 |